(No Model.)
H. HILL.
EVAPORATOR.
No. 397,916. Patented Feb. 19, 1889.
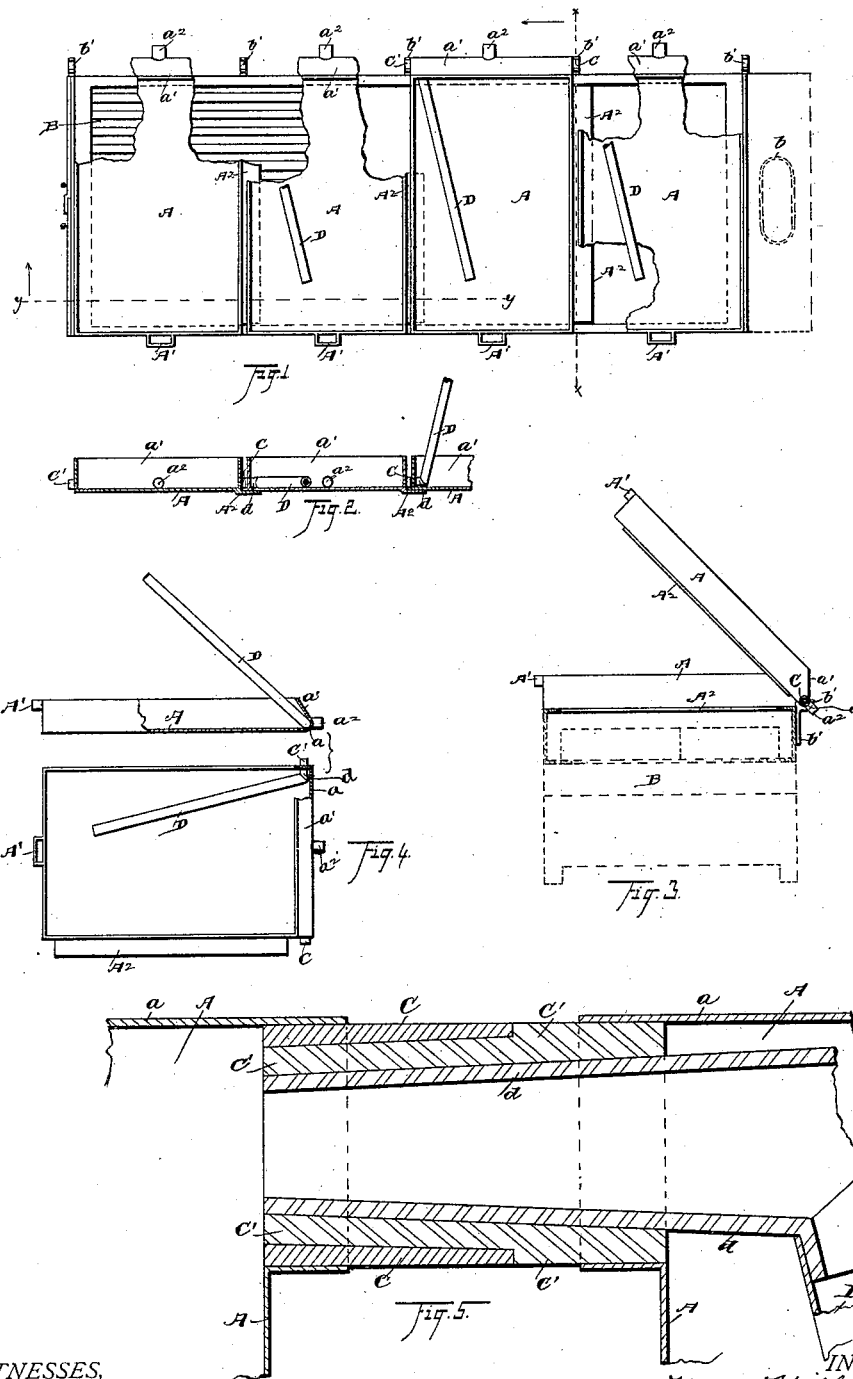
WITNESSES,
N.S. Amstutz
Geo. W. King
INVENTOR.
Henry Hill
By
Liggett & Liggett
ATTORNEYS.

UNITED STATES PATENT OFFICE.

HENRY HILL, OF CHESTER CROSS ROADS, OHIO.

EVAPORATOR.

SPECIFICATION forming part of Letters Patent No. 397,916, dated February 19, 1889.

Application filed September 5, 1888. Serial No. 284,606. (No model.)

*To all whom it may concern:*

Be it known that I, HENRY HILL, of Chester Cross Roads, in the county of Geauga, and State of Ohio, have invented certain new and useful Improvements in Sugar-Evaporators; and I do hereby declare the following to be a full, clear, and exact description of the invention, such as will enable others skilled in the art to which it pertains to make and use the same.

My invention relates to improvements in evaporating-pans in which a series of pans arranged side by side over an arch are respectively provided with laterally-projecting hollow trunnions located in line and at the corners of the pan, opposing trunnions telescoping to form tight joints, such trunnions serving as conducts from one pan to another, and serving also as trunnions proper in tilting the pans. The pans along the one end at the intersection of the bottom and end wall, where the trunnions occur, are rounded to fit the trunnions, and from thence the end wall slopes inward to form a trough for retaining the liquid when the pan is tilted. Bent circulating-tubes are provided, the short arms of these tubes being adapted to fit snugly inside the hollow trunnions aforesaid. The long arms of these tubes extend some distance into the body of the pan to cause a circulation of the liquid throughout the pans. The circulating-tube may be removed at pleasure, and by raising or lowering the free ends thereof the passage of liquid from one pan to the other may be regulated. The different pans, commencing with the forward pan over the arch, are provided each with a flange extending under the next adjacent rearward pan to close the intervening space between the pans, and thereby prevent the escape of heat from the arch.

In the accompanying drawings, Figure 1 is a plan view, partly broken away. Fig. 2 is a side elevation in section on line $y\,y$, Fig. 1. Fig. 3 is an elevation in section on line $x\,x$, Fig. 1. Fig. 4 is a corresponding elevation and plan, partly in section. Fig. 5 is an enlarged horizontal section showing more especially the hollow trunnions in position and the short arm of a circulating-tube in position in the trunnion.

A A represent evaporating-pans. These are usually rectangular in form and of any desired size, and are arranged side by side, as shown in Fig. 1, and set over a suitable arch or furnace—for instance, such as shown at B—the front end of the arch being at the left hand in Fig. 1, with smoke-pipe $b$ shown at the right hand. Each pan is provided with hollow trunnions C C', set in line at the lower corner at one end of the pan, the trunnions from the adjacent pans projecting toward each other and telescoping to form tight joints, these trunnions serving as conducts for the passage of liquid from one pan to another. The outside trunnions, C, rest in half-boxes $b'$, connected with the arch, by which arrangement the pans may be tilted to an inclined or to an upright position; or the pans may be readily removed from the arch, if necessary. The pans are preferably interchangeable, so that one pan need not remain permanently over the hottest portion of the arch. If the engaging surfaces of the trunnions are slightly tapering and are fitted with care, tight joints are insured, although the trunnions may turn easily the one within the other. The pan along the edge from one trunnion to the other is rounded, as shown at $a$, (see Figs. 3 and 4,) to correspond with the trunnions, and from thence the end wall, $a'$, slopes upward and inward, as shown, so that when the pan is tilted even to an upright position a deep trough is had to hold the liquid until it can flow into the next adjacent pan, and by means of the rounded section aforesaid the liquid may almost entirely be drained through the trunnions. A nozzle, $a^2$, connects with the rounded section of each pan for drawing off liquid when need be and for entirely draining the pan when it is tilted to an upright position. Such nozzles are fitted with any suitable stopper. (Not shown.)

Handles A' are provided at the ends of the pans opposite the trunnions, for convenience in tilting the pans.

The rear hollow trunnion may connect with an induction-tube, otherwise this and the forward trunnion of the series may be plugged, and by removing such plugs these end pans may take their place along the middle of the series of pans.

The trunnions aforesaid may be short, so that the pans need be separated only about an inch, (more or less,) and to close such intervening space between the pans against the escape of heat from the furnace each pan is provided with a flange, $A^2$, extending rearwardly a short distance under the next adjacent pan.

In operating the pans, as it is always the rearward pan that is first tilted, and so on throughout the series, these flanges do not interfere with such tilting operation.

D are circulating-tubes, having an elbow near the one end thereof, as shown. The short arm $d$ thereof fits inside trunnion $C'$, the bore of the trunnion and the exterior of the nozzle being preferably tapering, as shown, so that when the nozzle of the tube is crowded into the trunnion by hand the tube will maintain itself to any position in which it has been adjusted, and the free end thereof may be raised or lowered to regulate the flow of liquid from one pan to the other. The long arm of the circulating-tube extends to near the opposite end of the pans and insures a circulation through the pan, otherwise the liquid would take the shortest course across the pan from one trunnion to the other.

For many years prior to my present invention evaporating-pans were coupled rudely by means of pipes leading from the end of the respective pans, and such pipes of adjacent pans were connected by means of ordinary fitting—such, for instance, as elbows, T's, nipples, &c. After a time it was discovered that in case these joints were not screwed together too tightly a pan might be tilted, certain of the screw-joints turning the one member in the other, and such tilting of the pan by such means has been in vogue for many years. Such screw-joints, however, were ill adapted to the purpose, and either worked hard or were leaky, and usually both.

My improved device is cheap, simple, and effective, and the pans are easily removed from the arch, if need be, and are interchangeable, as aforesaid.

What I claim is—

1. The combination, with a series of evaporating-pans, of hollow trunnions projecting from said pans, the trunnions of one pan telescoping with the trunnions of the next adjacent pan, and a tube passing through the trunnions and projecting at one end into the pan, substantially as set forth.

2. The combination, with a series of evaporating-pans, of hollow internally-tapering trunnions projecting from said pans, the trunnions of one pan telescoping with the trunnions of the next adjacent pan, and a bent tube having its short arm adjustably secured within said trunnions, substantially as set forth.

3. The combination, with a series of evaporating-pans, of hollow trunnions projecting from said pans, the trunnions of one pan telescoping with the trunnions of the next adjoining pans, and flanges projecting from one bottom edge of each pan and extending beneath the bottom of the next adjacent pan, substantially as set forth.

4. The combination, with evaporating-pans connected by hollow trunnions, substantially as indicated, of circulating-tubes adapted at one end to fit and turn in the respective hollow trunnions, such circulating-tube having an elbow, the free end of said tube extending toward the end of the pan opposite the hollow trunnions, substantially as set forth.

In testimony whereof I sign this specification, in the presence of two witnesses, this 27th day of August, 1888.

HENRY HILL.

Witnesses:
CHAS. H. DORER,
ALBERT E. LYNCH.